April 16, 1957 W. A. SEARGEANT 2,789,214

JUNCTION TRANSISTOR SUPERREGENERATIVE RECEIVER

Filed Sept. 8, 1955 2 Sheets-Sheet 1

William A. Seargeant
INVENTOR.

BY Clarence A. O'Brien and Harvey B. Jacobson
Attorneys

William A. Seargeant
INVENTOR.

BY Clarence A. O'Brien
and Harvey B. Jacobson
Attorneys

United States Patent Office 2,789,214

Patented Apr. 16, 1957

2,789,214

JUNCTION TRANSISTOR SUPERREGENERATIVE RECEIVER

William A. Seargeant, Cashion, Ariz.

Application September 8, 1955, Serial No. 533,147

2 Claims. (Cl. 250—20)

This invention relates to radio frequency receivers, and is a transistor counterpart of a superregenerative radio frequency receiver.

The primary object of the present invention resides in the provision of a superregenerative receiver which employs a junction transistor and which is especially adapted to be manufactured out of relatively small and extremely strong and durable elements and components, thereby enabling the receiver to be used in military, commercial and other enterprises in the field in a convenient manner.

An additional object of the invention resides in the provision of a junction transistor receiver which employs a novel means for shifting reception from one station to another and which employs suitable switches for accomplishing this purpose without adversely affecting the operation of the receiver.

The construction of this invention features a receiver having a high frequency oscillator connected in the grounded base configuration of a transistor modulated by a lower frequency oscillator connected in the grounded emitter configuration of the transistor. The low frequency oscillations periodically interrupt the oscillations of the high frequency oscillator so as to obtain superregeneration.

These, together with the various ancillary objects and features of the invention which will become apparent as the following description proceeds, are attained by this junction transistor receiver, a preferred embodiment of which has been illustrated in the accompanying drawings, by way of example only, wherein.

Figure 1:
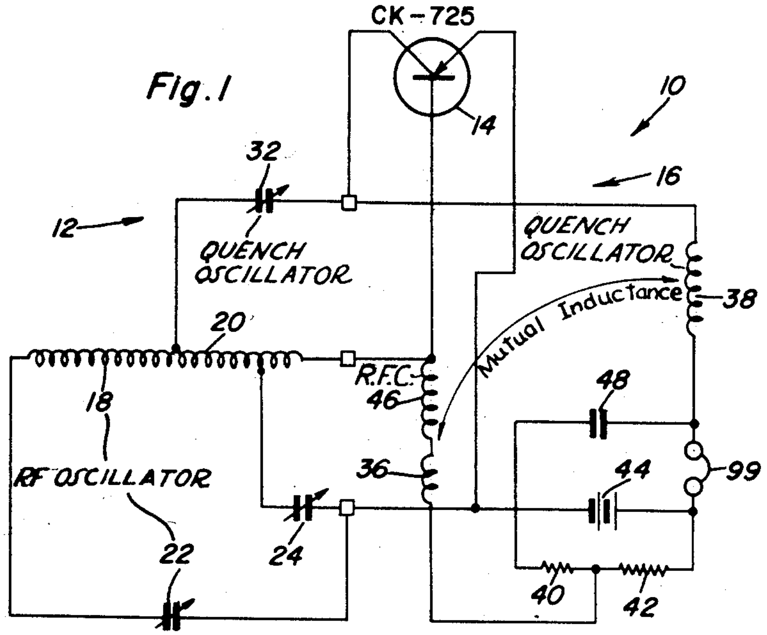
Figure 1 is a schematic diagram of the various electrical components comprising the receiver.

With continuing reference to the accompanying drawings wherein like reference numerals designate similar parts throughout the various views, reference numeral 10 generally designates the receiver comprising the present invention. The receiver substantially consists of a high frequency oscillator generally designated at 12 connected in the grounded base configuration of transistor 14 modulated by a lower frequency oscillator generally designated at 16 connected in the grounded emitter configuration of the transistor 14.

Figure 2:
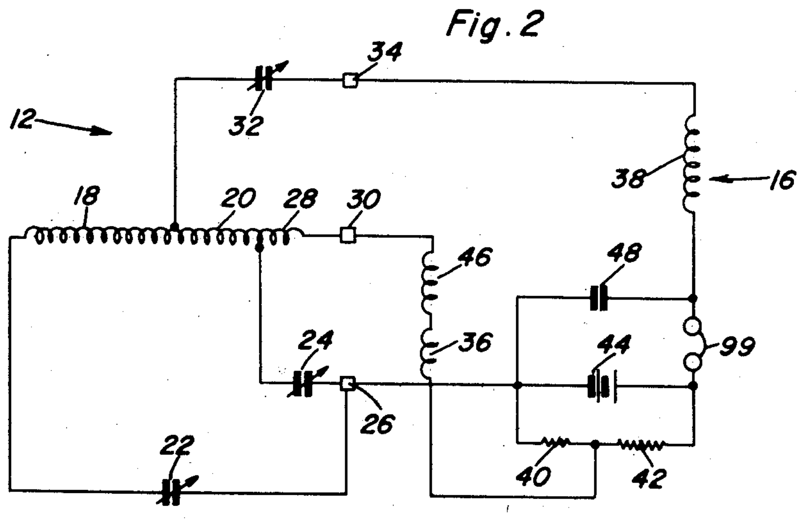
Figure 2 is a view similar to that of Figure 1 with the junction transistor not shown for purposes of clarity of the circuit.

First examining the high frequency oscillator, with reference to Figure 2 wherein for purposes of clarity, the junction transistor has not been shown connected, it will be noted that inductance coils 18 and 20 as well as capacitors 22 and 24 form the high frequency tank circuit. In the arrangement shown, capacitor 22 is connected to the emitter 26 of the transistor while coil 20 is connected, through inductance coil 28, to the base 30 of the transistor 14. If coil 28 and capacitor 24 are quite low impedances, then condenser 22, in one embodiment of the invention, not shown, may be connected to the base 30 rather than to the emitter 26 without essentially altering the fundamental operation of the oscillator, in which case, coil 28 would be a portion of the tank circuit, rather than capacitor 24.

The purpose of capacitor 32 is to convey R. F. current from the collector terminal 34 of the transistor to a properly positioned tap on the high frequency tank circuit inductance 18.

The inductance coil 18 together with inductance coils 20 and 28 intercept the magnetic field associated with the incoming signal (assuming no connected antenna), while the capacitor 22 serves as the principal tuning control. The coils 18, 20 and 28 are composed of wire from two of the windings used on ordinary "loop-stick" type antennas, and are wound about a common "loop-stick" type core of suitable size, the total inductance of the combination being in the neighborhood of one millihenry. In an embodiment of the invention, coil sections 28 and 20, respectively, may have fourteen and forty-two turns.

Capacitors 22 and 32 are ordinary, calibrated, air type variable condensers, of approximately 300 mmf. capacity; while capacitor 24 is of similar construction, so arranged that it may be supplemented, if found necessary, with additional fixed condensers to approximately 1000 mmf. capacity.

The coil 28 generates the high frequency input current which is conveyed through capacitor 24 to the input terminals (emitter 26 and base 30) of the transistor 14. The capacitor 24 also serves to pass the greater part of the oscillating current existing in the tank circuit and also helps to isolate the base 30 with respect to direct current from all circuit components that are not at the required bias voltage. Capacitors 22 and 32 are also involved in isolating the base terminal, and capacitor 24 functions to neutralize an inductive component present in the transistor input impedance, thus allowing the high frequency input current to be in phase with the voltage appearing across coil 28.

Referring now to the low frequency oscillator 16, it will be noted that the input and output circuits appear to exist more separately from each other than do the input and output circuits of the high frequency oscillator. The input circuit consists of a low frequency feed-back coil 36 magnetically coupled to inductance coil 38 in series with a biasing resistor combination including resistors 40 and 42. Strictly speaking, coil 36 is in series with the parallel combination of resistor 40 and resistor 42 neglecting the battery 44, but, since resistor 40 is much smaller than resistor 42, the low frequency input current can be considered as principally passing through resistor 40. It passes through resistor 40 because the base terminal of the transistor requires a bias voltage that the resistance combination provides; and because by-passing resistor 40 with a capacitance apparently does not improve the performance sufficiently to be justified, in most cases.

The low frequency input circuit is actually in parallel with the high frequency input circuit, and therefore, coil 46 is provided for the purpose of preventing R. F. current from flowing through the series combination of coil 36 and resistor 40. Flow of the R. F. current through the low frequency input circuit would possibly cause a R. F. loss to occur in resistor 40 and also result in the R. F. current being diverted from its proper path through the transistor input terminals.

The low frequency output circuit apparently consists only of the coil 38 shunted by condenser 32. The by-pass condenser 48 passes practically all of the current of quench frequency; and components including coils 28 and 20 as well as capacitor 24 together with the transistor input impedance allow free passage of the quench frequency current through capacitor 32. Therefore, the output circuit actually consists of a parallel combination of coil 38 and capacitor 32 together with the effective internal collector capacity. This forms a tuned circuit which will oscillate at resonant frequency or quench frequency when it is fed with a current of the same frequency through the collector terminal 34.

It is the function of the feed-back coil 36 to receive energy from the aforementioned tuned tank circuit in the form of an induced alternating current of the quench frequency and deliver this current in the proper phase and magnitude to the input terminals of the transistor with the phase of the current differing by 180° from the phase of the current in the tank circuit. Thus, the above mentioned current generated by coil 36, or the quench frequency input current flows through the input impedance of the transistor and results in the flow of another low frequency output current which is of the same frequency as the input current but of a reverse phase due to the phenomenon of the transistor grounded emitter configuration. This latter or output current travels from the collector terminal 34 through the tuned tank circuit and to the emitter terminal 26, and is of the correct phase to maintain oscillations in the tank circuit since 180° phase reversals occur in both input and output currents.

The above referred to low frequency output current acts as though it were generated by a relatively high voltage generator in the collector circuit, and hence, it possesses sufficient energy to overcome the losses in the tuned output circuit and maintain that circuit oscillating. The amplitude of these oscillations in the above mentioned output circuit may then be determined by either the number of turns of coil 36 or by the value of resistor 40.

In construction, the low frequency tank circuit coil 38 may have an inductance in the order of 100 millihenries while the inductance coil 46 may have a direct current resistance of 50 ohms and an inductance of about 3 millihenries. Resistors 40 and 42 are calibrated variable resistances of the potentiometer type, and good results may be obtained if resistor 40 is 400 ohms and resistor 42 is 5000 ohms when the battery 44 is 1.4 volts.

When the high frequency oscillator 12 and the low frequency oscillator 16 interact with each other in such manner that the low frequency oscillator 16 periodically interrupts the oscillations of the high frequency oscillator 12, superregeneration is obtained. This is because the high frequency oscillator circuit 12 possesses a conductance which may be considered to periodically change in sign for each oscillation of the low frequency oscillator 16. Thus, during a part of the low frequency cycle, while the collector voltage is low, the above mentioned conductance will be positive due to the R. F. resistance of the tuned R. F. circuit itself, and due to the resistance coupled into it by the transistor input impedance. Thus, such oscillations as may exist in the tank circuit, at that time, will die down and the tank circuit reaches a non-oscillating state. However, as the collector voltage again begins to rise in accordance with the low frequency oscillations, the previously mentioned high frequency tank circuit conductance will change from a positive to a negative value, becoming more negative as the collector voltage tends to rise, and the tank circuit enters a state where oscillations in it will grow rapidly, once they are initiated. Thus, it is a function of the incoming signal to start such R. F. oscillations occuring, and this it may do, in a shorter or longer time, depending upon the strength of the incoming signal.

Hence, strong signals may cause oscillations to occur earlier and the tank circuit to oscillate for a longer period of time before such oscillations are again quenched, than do weak signals. Thus, the direct current component of the output current, which because of rectification, varies in accordance with the strength and duration of the R. F. pulses will also follow the variations of the incoming signal.

The receiver may be tuned to various stations by means of switches. Such arrangements are shown in Figures 3 through 6, which are now referred to.

Figure 3:
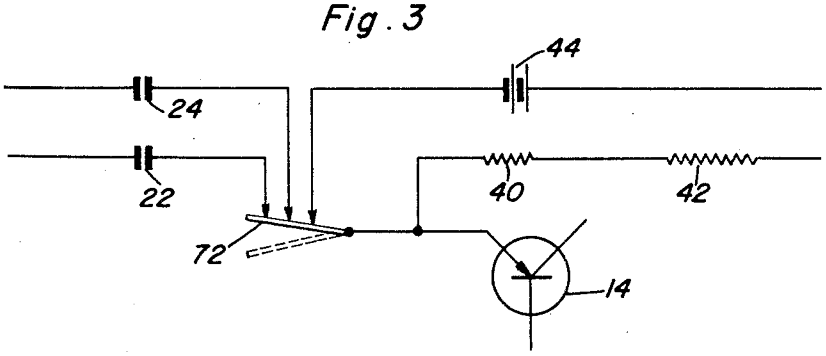
Figure 3 is a schematic diagram of a triple-pole, single-throw switch which may be utilized in tuning the receiver.

The condenser 22 is the principal tuning capacitor and must be an exact value in order to tune in a particular station, while the condenser 24 need only be given an approximate value. Therefore, it is possible to select a single value of capacitor 24 which may be used with several values, each representing a different station, of capacitor 22, providing, of course, that the values of capacitor 22 do not differ too much from each other. Each station would then be selected by making use of a double-pole, single-throw switch, as is shown at 70 in Figure 4, or by a triple-pole, single-throw switch 72 as shown in Figure 3. These switches may be used in any suitable number, depending upon the number of stations in the band, and since a superregenerative detector does not need to be tuned sharply, each switch, when thrown, will simultaneously connect the emitter 26 to one end of the battery 44 and to the appropriately selected fixed values of the capacitors 22 and 24.

Figure 5:
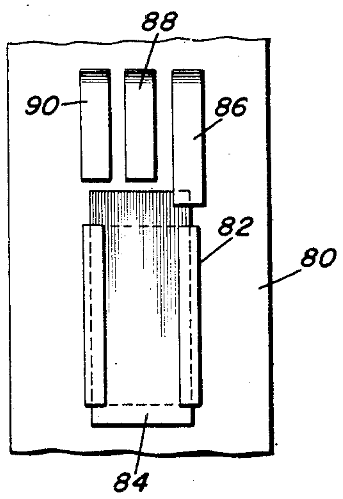
Figure 5 is a plan view of a type of switch which can be utilized in conjunction with the invention.
Figure 6:
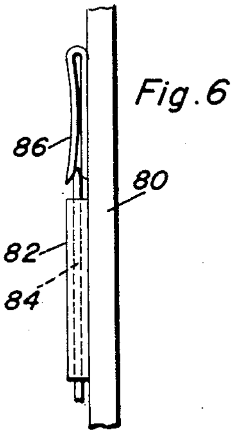
Figure 6 is a side elevational view of the switch.

While conventional miniature triple-pole, single-throw switches or double-pole, single-throw switches can be used, it would be of advantage to use the specially constructed switch of the type shown in Figures 5 and 6. This is because, in some instances, during the first instant that the receiver is put in operation, the high frequency oscillations may gain control over the low frequency oscillations or thereby prevent the low frequency oscillations from starting unless the low frequency oscillations are given opportunity to start first. The low frequency oscillations may be given this opportunity to start first by simply arranging the above mentioned switches so that the battery circuit will be first to be completed. Condensers 22 and 24 as may be desired may be connected into the circuit at a later instant in time than the battery 44 of the receiver. Thus, low frequency oscillations will then have an appreciable period in which to commence while the high frequency oscillations which depend on a complete tank circuit for their existance will not start until the switch is completely closed. The switch structure may include an insulating base 80 having a channel-shaped guide 82 of a suitable metallic construction in which a switch plate 84 is slidably movable.

The switch plate 84 is of a spring material and has a permanent deformation, and thus if the switch plate 84 were removed from the guide 82, it would appear to curve, from a side view. Any suitable means to move the switch plate 84, such as a projection of some type, may be attached to the exposed surface of the switch plate 84.

Switch components 86, 88 and 90 also of spring material are electrically connected with the battery 44, the condenser 24 and the condenser 22, respectively, and thus, the components of this switch cause the various parts to be connected successively due to the movement of the plate 84 which is connected to the emitter terminal 26 of the transistor and thereby allows the emitter terminal to successively make connection to the battery and then to the other components of the circuit.

It might be noted that the condensers to which the above mentioned switch components 88 and 90 are connected (that is, condensers 24 and 22 of Figures 3 and 4) might be trimmer condensers, instead of the fixed condensers indicated. This would evidently simplify readjusting the receiver in case of station changes, etc.

Figure 4:
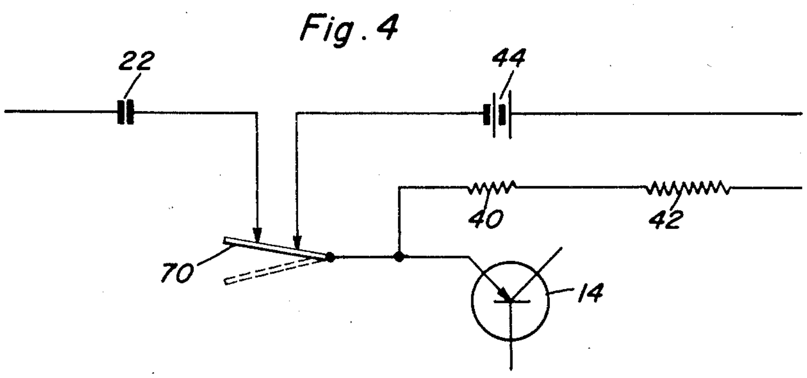
Figure 4 is a schematic diagram illustrating the connections in the receiver circuit of a double-pole, single-throw switch which may be used for tuning.

Since there is generally an undesirable increase in the amplitude of oscillation when oscillators are capacitively tuned to a higher frequency, it might be desirable, when receiving the higher frequency stations of a particular band, to include appropriate resistances in series with the above mentioned condensers 22 and 24 of Figures 3 and 4; if it was found advantageous in this manner to restrict the amplitude of oscillation of the high frequency tank circuit to a proper value. Attaching condenser 24 to a lower potential point on coil 28 may also result in decreasing the amplitude of the high frequency oscillations.

It would evidently be possible for the movable arm of switch 72 of Figure 3 to be the rotary member of a multithrow switch which, in the course of its rotation, could pass through several switch positions of the type indicated in Figure 3; and thus a single multithrow switch might replace the previously mentioned plurality of individual single throw switches. It is possible that such an arrangement would be advantageous if the receiver dimensions were small.

It should be mentioned that resistance 40 might consist of an appropriate thermistor, which could largely counteract the tendency of a temperature change to cause an undesirable variation in the collector current of the transistor; or, the above mentioned temperature effect might also be counteracted to some extent by means of an appropriately by-passed stabilization resistor, properly located in the emitter circuit of the transistor. The just mentioned stabilization resistor, incidentally, could also have other advantages; such as stabilizing the collector current against small changes caused by alternately using different transistors of the same type in the same circuit, these different transistors possibly having individual differences between themselves.

In the case of circuits connected in the grounded base configuration, there is, as was previously mentioned, an inductive component present in the transistor input impedance; and it was observed that the condenser 24, by being given a suitable valve, might serve to prevent this inductive component from causing a phase change in the high frequency input current. It should also be noted that the above mentioned inductive component varies with frequency, and hence, it is advantageous for the condenser 24 to be capable of capacity variation. For this reason, condenser 24 appears as a variable condenser in Figures 1 and 2. Furthermore, the above noted change of the inductive component with frequency is such, for example, as to allow simultaneous increases and decreases in the capacities of the two condensers 24 and 22 with frequency; and hence, in some circumstances, these two condensers (of Figures 1 and 2) might be operated in unison, as a ganged or dual condenser, if desired.

The above noted variation of condenser 24, with frequency, is particularly applicable at relatively high frequencies, since at such frequencies, the just mentioned inductive component is large enough to be of significance. In the case of the transistor type mentioned herein (a Raytheon CK 725), for instance, this variation of condenser 24 is apparently essential when receiving stations of the broadcase band.

This receiver, as described, is quite suitable for high frequency reception, since the high frequency oscillator circuit is connected in the grounded base configuration, which is the most efficient configuration at high frequencies. To receive lower frequencies, however, it might be desirable to connect the high frequency oscillator circuit in the grounded emitter configuration; which may be done by joining the junction of coils 20 and 28 to the emitter terminal, and connecting condenser 24 between coil 28 and the base terminal.

This receiver could of course include amplifying stages, in some circumstances; to operate a speaker, or possibly to energize a relay. Such stages could be coupled to the receiver simply by substituting an appropriate interstage transformer for the phones shown in the diagram at 99.

It is to be noted that the various components of the receiver, with the exception of the battery 44, the turning mechanism and the phones indicated at 99 may be embedded in plastic to form a receiver that will probably be of longer life than one containing electrolytic condensers.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention as claimed.

What is claimed as new is as follows:

1. A superregenerative transistor receiver comprising a junction transistor, a high frequency oscillator circuit, and a lower frequency oscillator circuit, said lower frequency oscillator circuit when energized producing oscillations that periodically interrupt oscillations produced by said high frequency oscillator circuit when energized, and means for varying the resonant frequency of said high frequency oscillator circuit, said receiver including a battery, said means including switch means connecting said receiver to said battery, said switch means including an insulative base, a guide attached to said base, a switch plate slidably mounted in said guide, and a plurality of contacts, one of said contacts being arranged closer to said guide than the other of said contacts whereby upon actuation said switch plate will engage one of said contacts before said other of said contacts.

2. A superregenerative transistor receiver comprising a junction transistor, a high frequency oscillator circuit, and a lower frequency oscillator circuit, said lower frequency oscillator circuit when energized producing oscillations that periodically interrupt oscillations produced by said high frequency oscillator circuit when energized, and means for varying the resonant frequency of said high frequency oscillator circuit, said receiver including a battery, said means connecting said receiver to said battery, said means including a set of variable capacitors, said means including switch means for selectively connecting one of said variable capacitors in said high frequency oscillator circuit, said switch means connecting said receiver to said battery, said switch means connecting said low frequency oscillator circuit to said battery before connecting said high frequency oscillator circuit to said battery, said switch means including an insulative base, a guide attached to said base, a switch plate slidably mounted in said guide, and a plurality of contacts, one of said contacts being arranged closer to said guide than the other of said contacts whereby upon actuation said switch plate will engage said one of said contacts before said other of said contacts.

References Cited in the file of this patent

UNITED STATES PATENTS

| | | |
|---|---|---|
| 2,201,162 | Elliott | May 21, 1940 |
| 2,644,080 | Richman | June 30, 1953 |

OTHER REFERENCES

Superregenerative Transistor Receiver, by Hughes, Radio & Television News, March 1954, pp. 72, 73, 91.